US007974991B2

(12) United States Patent
Jones et al.

(10) Patent No.: US 7,974,991 B2
(45) Date of Patent: Jul. 5, 2011

(54) WORD-PROCESSING DOCUMENT STORED IN A SINGLE XML FILE THAT MAY BE MANIPULATED BY APPLICATIONS THAT UNDERSTAND XML

(75) Inventors: Brian M. Jones, Redmond, WA (US); Andrew K. Bishop, Redmond, WA (US); Daniel R. Snyder, Bellevue, WA (US); Marcin Sawicki, Kirkland, WA (US); Robert A. Little, Redmond, WA (US); Anthony D. Krueger, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 11/005,192

(22) Filed: Dec. 6, 2004

(65) Prior Publication Data
US 2005/0108198 A1    May 19, 2005

Related U.S. Application Data

(63) Continuation of application No. 10/187,060, filed on Jun. 28, 2002, now Pat. No. 7,523,394.

(51) Int. Cl.
*G06F 7/00* (2006.01)
*G06F 17/00* (2006.01)
(52) U.S. Cl. ......... 707/802; 707/803; 707/805; 715/234
(58) Field of Classification Search ... 707/1, 100–103 Z, 707/205, 791, 802, 803, 999.1–999.103, 707/805; 715/234
See application file for complete search history.

(56) References Cited

U.S. PATENT DOCUMENTS

| | | | |
|---|---|---|---|
| 4,751,740 A | 6/1988 | Wright | 382/180 |
| 4,864,501 A | 9/1989 | Kucera et al. | 704/8 |
| 4,866,777 A | 9/1989 | Mulla et al. | 704/206 |
| 5,185,818 A | 2/1993 | Warnock | 382/54 |
| 5,295,266 A | 3/1994 | Hinsley et al. | 718/101 |
| 5,557,722 A | 9/1996 | DeRose et al. | 715/513 |
| 5,579,466 A | 11/1996 | Habib et al. | 715/529 |
| 5,586,241 A | 12/1996 | Bauermeister et al. | 395/167 |
| 5,781,714 A | 7/1998 | Collins et al. | 395/171 |
| 5,787,451 A | 7/1998 | Mogilevsky | 715/533 |

(Continued)

FOREIGN PATENT DOCUMENTS
EP    1230566    8/2002

OTHER PUBLICATIONS

Ayers, Larry, "AbiWord's Potential", Linux Gazette, Issue 43, Jul. 1999, pp. 1-4.*

(Continued)

*Primary Examiner* — John Breene
*Assistant Examiner* — Hares Jami
(74) *Attorney, Agent, or Firm* — Merchant & Gould

(57) ABSTRACT

A word processor including a native XML file format is provided. The well formed XML file fully represents the word-processor document, and fully supports 100% of word-processor's rich formatting. There are no feature losses when saving the word-processor documents as XML. A published XSD file defines all the rules behind the word-processor's XML file format. Hints may be provided within the XML associated files providing applications that understand XML a shortcut to understanding some of the features provided by the word-processor. The word-processing document is stored in a single XML file. Additionally, manipulation of word-processing documents may be done on computing devices that do not include the word-processor itself.

10 Claims, 6 Drawing Sheets

U.S. PATENT DOCUMENTS

| | | | | |
|---|---|---|---|---|
| 5,881,225 | A | 3/1999 | Worth | 726/17 |
| 5,895,476 | A | 4/1999 | Orr et al. | 707/517 |
| 6,023,714 | A | 2/2000 | Hill et al. | 715/513 |
| 6,031,989 | A | 2/2000 | Cordell | 717/109 |
| 6,044,387 | A | 3/2000 | Angiulo et al. | 715/533 |
| 6,092,068 | A | 7/2000 | Dinkelacker | 707/100 |
| 6,119,136 | A | 9/2000 | Takata et al. | 715/513 |
| 6,141,754 | A | 10/2000 | Choy | 726/1 |
| 6,182,029 | B1 | 1/2001 | Friedman | 704/9 |
| 6,209,124 | B1 | 3/2001 | Vermeire et al. | 717/114 |
| 6,230,173 | B1 | 5/2001 | Ferrel et al. | 715/513 |
| 6,233,592 | B1 | 5/2001 | Schnelle et al. | 715/513 |
| 6,249,794 | B1 | 6/2001 | Raman | 715/500 |
| 6,336,124 | B1 | 1/2002 | Alam et al. | 715/523 |
| 6,397,232 | B1 | 5/2002 | Cheng-Hung et al. | 715/523 |
| 6,507,856 | B1 | 1/2003 | Chen et al. | 715/513 |
| 6,507,857 | B1 | 1/2003 | Yalcinalp | 715/513 |
| 6,519,617 | B1 | 2/2003 | Wanderski et al. | 715/513 |
| 6,535,896 | B2 | 3/2003 | Britton et al. | 715/523 |
| 6,538,673 | B1 | 3/2003 | Maslov | 715/853 |
| 6,613,098 | B1 | 9/2003 | Sorge et al. | 715/503 |
| 6,675,353 | B1 | 1/2004 | Friedman | 715/513 |
| 6,697,999 | B1 | 2/2004 | Breuer et al. | 715/517 |
| 6,725,423 | B1 | 4/2004 | Muramoto et al. | 715/513 |
| 6,725,426 | B1 | 4/2004 | Pavlov | 715/523 |
| 6,754,648 | B1 | 6/2004 | Fittges et al. | 707/1 |
| 6,763,500 | B2 | 7/2004 | Black et al. | 715/513 |
| 6,785,685 | B2 | 8/2004 | Soetarman et al. | 707/101 |
| 6,799,299 | B1 | 9/2004 | Li et al. | 715/513 |
| 6,829,570 | B1 | 12/2004 | Thambynayagam et al. | 703/10 |
| 6,829,745 | B2 | 12/2004 | Yassin et al. | 715/513 |
| 6,845,483 | B1 | 1/2005 | Carroll | 715/513 |
| 6,886,115 | B2 | 4/2005 | Kondoh et al. | 714/52 |
| 6,918,086 | B2 | 7/2005 | Rogson | 715/533 |
| 6,928,610 | B2 | 8/2005 | Brintzenhofe et al. | 715/517 |
| 6,938,204 | B1 | 8/2005 | Hind et al. | 715/515 |
| 6,941,510 | B1 | 9/2005 | Ozzie et al. | 715/513 |
| 6,954,898 | B1 | 10/2005 | Nakai et al. | 715/542 |
| 6,968,503 | B1 | 11/2005 | Chang et al. | 715/526 |
| 6,996,772 | B2 | 2/2006 | Justice et al. | 715/513 |
| 7,028,009 | B2 | 4/2006 | Wang et al. | 705/51 |
| 7,111,234 | B2 | 9/2006 | Peck et al. | 715/255 |
| 7,257,772 | B1 | 8/2007 | Jones et al. | 715/530 |
| 7,275,209 | B1 | 9/2007 | Jones et al. | 715/513 |
| 7,376,650 | B2 | 5/2008 | Ruhlen | 707/6 |
| 7,389,473 | B1 | 6/2008 | Sawicki et al. | 715/255 |
| 7,523,394 | B2 | 4/2009 | Jones et al. | 715/236 |
| 7,533,335 | B1 | 5/2009 | Sawicki et al. | 715/239 |
| 7,562,295 | B1 | 7/2009 | Jones et al. | 715/236 |
| 7,565,603 | B1 | 7/2009 | Jones et al. | 715/236 |
| 7,571,169 | B2 | 8/2009 | Jones et al. | 707/100 |
| 7,584,419 | B1 | 9/2009 | Jones et al. | 715/234 |
| 7,607,081 | B1 | 10/2009 | Jones et al. | 715/234 |
| 7,650,566 | B1 | 1/2010 | Jones et al. | 715/236 |
| 2001/0014900 | A1 | 8/2001 | Brauer et al. | 707/513 |
| 2001/0032217 | A1 | 10/2001 | Huang | 707/513 |
| 2002/0085020 | A1* | 7/2002 | Carroll, Jr. | 345/700 |
| 2002/0087702 | A1 | 7/2002 | Mori | 709/228 |
| 2002/0091725 | A1 | 7/2002 | Skok | 707/501.1 |
| 2002/0116420 | A1 | 8/2002 | Allam et al. | 707/526 |
| 2002/0124115 | A1 | 9/2002 | McLean et al. | 709/310 |
| 2002/0184189 | A1* | 12/2002 | Hay et al. | 707/1 |
| 2003/0007014 | A1* | 1/2003 | Suppan et al. | 345/853 |
| 2003/0018668 | A1 | 1/2003 | Britton et al. | 707/513 |
| 2003/0066033 | A1 | 4/2003 | Direen et al. | 715/513 |
| 2003/0101416 | A1 | 5/2003 | McInnes et al. | 715/513 |
| 2003/0135584 | A1 | 7/2003 | Roberts et al. | 709/218 |
| 2003/0163784 | A1 | 8/2003 | Daniel et al. | 715/514 |
| 2003/0167444 | A1 | 9/2003 | Zorc | 715/513 |
| 2003/0231626 | A1 | 12/2003 | Chuah et al. | 370/389 |
| 2004/0073871 | A1 | 4/2004 | Giannetti | 715/513 |
| 2004/0098320 | A1* | 5/2004 | Mitsuhashi et al. | 705/27 |
| 2004/0194035 | A1 | 9/2004 | Chakraborty | 715/531 |
| 2004/0205553 | A1 | 10/2004 | Hall et al. | 715/513 |
| 2004/0210818 | A1 | 10/2004 | Jones et al. | 715/500 |
| 2005/0102265 | A1 | 5/2005 | Jones et al. | 707/1 |
| 2005/0108278 | A1 | 5/2005 | Jones et al. | 707/102 |

OTHER PUBLICATIONS

"XML Schema for AbiWord Markup Language", downloaded from http://www.abisource.com/awml.xsd, May 27, 2000, pp. 1-3.*

"XML Schema Part 1: Structure". W3C Recomendation, May 2, 2001, downloaded from http://www.w3.org/TR/2001/REC-xmlschema-1-20010502/, pp. 1-19.*

Ayers, Larry, "AbiWord's Potential", Linux Gazette, Issue 43, Jul. 1999, pp. 1-4.*

"XML Schema for AbiWord Markup Language", downloaded from http://www.abisource.com/awml.xsd, May 27, 2000, pp. 1-3.*

"XML Schema Part 1: Structure". W3C Recomendation, May 2, 2001, downloaded from http://www.w3.org/TR/2001/REC-xmlschema-1-20010502/, pp. 1-19.*

Castro, Elizabeth, "XML for the World Wid Web", publsihed by Peachpit Press, 2001, pp. 182-184.*

Ayers, Larry, "AbiWord's Potential", Linux Gazette, Issue 43, Jul. 1999, pp. 1-4.*

"XML Schema for AbiWord Markup Language", downloaded from http://www.abisource.com/awml.xsd, May 27, 2000, pp. 1-3.*

"XML Schema Part 1: Structure". W3C Recomendation, May 2, 2001, downloaded from http://www.w3.org/TR/2001/REC-xmlschema-1-20010502/, pp. 1-19.*

Castro, Elizabeth, "XML for the World Wid Web", publsihed by Peachpit Press, 2001, pp. 182-184.*

EchoEcho, "HTML Text: Basefont", publicly available since at least Jun. 11, 2002, EchoEcho.com, pp. 1-3; http://web.archive.org/web/20020611063417/http://www.echoecho.com/htmltext01.htm.

Castro, Elizabeth, "XML for the World Wide Web: Visual QuickStart Guide," Oct. 23, 2000, Peachpit Press, pp. 1-6.

Harold, Rusty Elliotte, "XML Bible", IDG Books Worldwide, 1999, title page, copyright page, and pp. 1-15, 95-132, 191-200, 333-336, 352-360, and 433-567.

O'Reilly, "HTML & XHTML The Definitive Guide," 4th Edition, Copyright 2000, pp. 1-6, http://oreilly.jungles.ru/webdesign/xhtml/ch16_03.htm.

Sun Microsystems, "StarOffice XML File Format Working Draft", Jan. 2001, Draft 10, pp. 19 and 234, http://web.archive.org/web/20010603030227/xml.openoffice.org/xml_specification_draft.pdf.

Sun Microsystems, "StarOffice XML File Format Working Draft", Jan. 2001, Draft 10, pp. 48, 49, 51, 54-58.

"AbiWord", http://en.wikipedia.org/wiki/AbiWord>, Oct. 19, 2005, 2 pgs.

Walther, P., "XML Dokumente in Microsoft Word mit neuem Produkt der struktur AG kostenlos testen", http://www.contentmanager.de/magazine/news_h2695_xml_dokumente_in_microsoft_word_mit_neuem.html>, Jun. 5, 2002, 2 pgs.

Chipr, "AbiWord—Word Processing for Everyone", http://www.kuro5hin.org/?op=displaystory;sid=2002/4/22/22406/9615>, Apr. 23, 2002, 8 pgs.

"Introduction to AbiWord", http://web.archive.org/web/20010608211934/www.abisource.com/help/en-US/index.htm, Jun. 8, 2001, 3 pgs.

"XML Schema for AbiWord Markup Language", http://www.abisource.com/awml.xsd>, Apr. 27, 2000, 3 pgs.

DevX Staff, "Twelve Dynamic HTML Lessons," downloaded from http://devx.com/projectcool/Article/18103/1763, published Jan. 1, 2000, pp. 1-3.

Mansfield, Ron, "Mastering Word 97 Fourth Edition", 1997, Sybex, pp. 221-222, 271-273, 278, 280, 283-284, 325-330, 539-540, 1015.

Meyer, Eric, "Cascading Style Sheets: HTML and CSS", May 2000, O'Reilly, pp. 1-17.

Scott Boggan and Micael De Laurentis, A System for Matching static or distortable fonts; May 1994; pp. 1-9; http://www.byte.com/art/940/sec12/art1.htm.

W3C, Fonts, Jan. 24, 2001, W3C, pp. 1-4, http://web.archive.org/web/20010124044900/ttp://www13.w3.org/TR/REC-CSS2/fonts.html#matching.

WayBack Machine, Feb. 15, 2006, p. 1, http://web.archive.org/web/*/http://www.w3.org/TR/REC-CSS2/fonts.html—no Copy Available, Dead Link.

XHTML Examples, "XHTML explained—XHTML Examples," downloaded from http://web.archive.org/web/20020603200919/ http://www.javascriptkit.com/howto/xhtml_intro4.Shtml, published Jun. 3, 2002, pp. 1-3.
Linss, Peter, "CSS Namespace Enhancements (proposal)", Jun. 1999, W3C, pp. 1-7.
Castro, Elizabeth, "XML for the World Wide Web: Visual QuickStart Guide," Oct. 23, 2000, Peachpit Press, pp. 1-6.
Harold, Rusty Elliotte, "XML Bible", IDG Books Worldwide, 1999, title page, copyright page, and pp. 1-15, 95-132, 191-200, 333-336, 352-360, and 433-567.
O'Reilly, "HTML & XHTML The Definitive Guide," 4th Edition, Copyright 2000, pp. 1-6, http://oreilly.jungles.ru/webdesign/xhtml/ch16_03.htm.
Sun Microsystems, "StarOffice XML File Format Working Draft", Jan. 2001, Draft 10, pp. 19 and 234, http://web.archive.org/web/20010603030227/xml.openoffice.org/xml_specification_draft.pdf.
Sun Microsystems, "StarOffice XML File Format Working Draft", Jan. 2001, Draft 10, pp. 48, 49, 51, 54-58.
Pradeep Jain; "Creating XML from Microsoft Word: The Challenges", Dec. 3-8, 2000, pp. 136-144.
Jon Bosak, "XML: The Universal Publishing Format", 1998, pp. 1-2.
M. Fernandez et al., "Advanced Technology Seminar", p. 323.
Uros Novak et al., "Experimental XSLT Processor for Objects", Proceedings of the IASTED International Conference, Applied Informatics, Feb. 18-21, 2002, pp. 277-282.
HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf, pp. 1-29.
Wen, Howard, "AbiWord: Open Source's Answer to Microsoft Word", Linux Dev Center, downloaded from http://www.linuxdevcenter.com/Ipt/a/1636, Mar. 14, 2002, pp. 1-3.
Dzuba, Vassili, "Majix 1.0: A WORD to XML Converter", downloaded from http://xml.coverpages.org/majixl0Ann.html, Oct. 6, 1998, pp. 1-2.
Schmelzer, Ronald, "ZapThink Briefing Note—HyperVision—Automating Valid XML Document Creation Within Microsoft Word", ZapThink LLC, Feb. 8, 2002, pp. 1-6.
Alschuler, Liora, "Getting the Tags In: Vendors Grapple With XML-Authoring, Editing and Cleanup", Seybold Report on Internet Publishing, vol. 5, No. 6, Feb. 2001, pp. 1-6.
Moseley, Lonnie et al., "Mastering Microsoft Office 97 Professional Edition", Sybex, 1996, pp. 87, 94-98, 103-105, 165-179, 1114-1115.
Liefke, Harmut et al., "Xmill: An Efficient Compressor for XML Data", SCM SIGMOD Record, vol. 29, Issue 2, May 2000, pp. 153-164.
McGrath, Robert, "Representing "Binary" Data in XML", downloaded from http://ndf.ncsa.uiuc.edu/HDF5/XML/tools/binary.html, Mar. 2001, pp. 1-4.
Jeong, Euna et al., "Semistrutured Data: Induction of Integrated View for XML Data With Heterogeneous DTDs", Proceedings of the Tenth International Conference on Information and Knowledge Management, Oct. 2001, pp. 151-158.
"XML Schema—Lecture 4 Notes", downloaded from http://www.cs.rpi.edu/~puninj/XMLJ/classes/class4/all.html, Nov. 21, 2001, pp. 1-14.
Mansfield, Ron, "Mastering Word 97 Fourth Edition", 1997, Sybex, pp. 269-270, 412, 449-457, 985-986, 1010-1011, 1028-1029, 1031-1034.
M. Schrage, "Proxima, A presentation-oriented editor for strucctured documents", IPA, ISBN 12-345-6789-0, Jun. 4, 1973, pp. 1-186.
V. Turau, "Making legacy data accessible for XML applications", University of Applied Sciences, Department of Computer Science, Wiesbaden, Germany, 1999, pp. 1-11.
J. Geigel et al., "Automatic Page Layout Using Genetic Algorithms for Electronic Albuming", Proceedings of Electronic Imaging, Jan. 21-26, 12 pgs.
M. Kirjavainen, "XML Browsers", http://mia.ece.uic.edu/~papers/WWW/MultimedicaStandards/XML_browsers.pdf, last accessed Mar. 14, 2005, 16 pgs.
Rusty Elliotte, "XML Bible", IDG Books Worldwide, Inc., 1999, pp. 1-12, 120-127, 333-335.
Microsoft, "Microsoft Word 2000", 1999, Microsoft, Screenshots 1-7, pp. 1-2.
Oliver Meyer, "Creating Validated XML Documents on the Fly Using MS Word", Oct. 20, 2002, pp. 113-121.
Simplson, J., "Just XML", Prentice Hall, Second Edition, 2001, cover, copyright page, and p. 31.
"Introduction to XML" University of Washington Computing and Communications, copyright 1999, on the Internet as of Jun. 24, 2001, downloaded from http://web.archive.org/web/20010624123830/http://www.washington.edu/computing/training/540/xml_well.html, 1 pg.
Munro, J., "StarOffice 6.0 Lives Up to its Name", PCMAG.com, May 23, 2002, www.pcmag.com/print_article2/0,1217,a=27287,00.asp, downloaded pp. 1-3.
Castro, E., "XML for the World Wide Web, Visual Quickstart Guide", Peachpit Press, 2001, p. 245.
Rodriguez, M., "XML: Twig", xmltwig.com, copyright 2003, downloaded pp. 1-4, web.archive.org/web/20030422002120/http://www.xmltwig.com/xmltwig/tools/xml_spellcheck.
Xmetal 1.0, Webreference.com, Oct. 29, 1999, downloaded pp. 1-2, www.webreference.com/html/watch/xmetal/5.html.
Altova Inc. & Altova GmbH, "XML Spy 4.0 Manual," copyright 1998-2001, Sep. 10, 2001, downloaded from: http://www.altova.com/download.sub.—archive.html and link, pp. 18-286.
"TEI, The XML Version of the TEI Guidelines" Text Encoding Initiative [TEI] Consortium, Copyright 2001, with Introductory Note, dated Mar. 2002, downloaded from: http://www.tei-c.org.uk/Drafts/P4/driver.xml, on Nov. 25, 2006, downloaded pp. 1-93.
M. Fernandez and S. Amer-Yahia; Advanced Technology Seminar 2—Techniques for Storing XML; pp. 323, 774-776.
Michael Champion; Storing XML in Databases; EAI Journal, Oct. 2001; pp. 53-55.
JP Morgenthal; XML for Data Integration; EAI Journal, Oct. 2001; pp. 13-14, 16.
Sihem Amer-Yahia, Mary Fernandez, Divesh Srivastava and Yu Xu; PIX: A System for Phrase Matching in XML Documents: A Demonstration; 2003 IEEE; pp. 774-776.
Altova Inc. & Altova GmbH, "XML Spy 4.0 Manual," copyright 1998-2001, published Sep, 9, 2001, pp. 1-401.
Alshuler, L., "Getting the Tags in: Vendors Grapple with XML-Authoring, Editing and Cleanup," The Seybold Report on Internet Publishing, vol. 5, No. 6, Feb. 2001, pp. 1-6.
HV, Ltd., "WorX Standard Edition (SE) 'XML Authoring Made Easy'," HyperVision, Ltd., published on the Internet as of Jun. 3, 2001 as a PDF file linked to http://web.archive.org/web/20010603152210/www.hvltd.com/defaultasp?name=-information/xml/worxseOverview.xml&display=information/xsl/default.xsl, pp. 1-9.
Mathias Neumuller and John N. Wilson; Improving XML Processing Using Adapted Data Structures; Oct. 7-10, 2002; pp. 206-220.
Surajit Chaudhuri and Kyuseok Shim; Storage and Retrieval of XML Data using Relational Databases; Advanced Technology Seminar 4; Abstract; Mar. 5, 2003; p. 802.
Ullas Nambiar et al.; Efficient XML Data Management: An Analysis; EC-Web 2002, LNCS 2455; pp. 87-98.
Volkan Atalay and Erkan Arslan; An SGML Based Viewer for Form Documents; 1999 IEEE Jul. 1999; pp. 201-204.
Xin Zhang et al.; Clock: Synchronizing Internal Relational Storage with External XML Documents; 2001 IEEE Jun. 2001; pp. 111-118.
Robert D. Cameron; REX: XML shallow parsing with regular expressions; Markup Languages: Theory & Practice 1.3, Summer 1999; pp. 61-88.
Danny Heijl; The Delphi XML SAX2 Component & MSXML 3.10; Dr. Dobb's Journal, Sep. 2001; pp. 42-54.
Chiyoung Seo et al.; An efficient inverted index technique for XML documents using RDBMS; Received Jan. 16, 2002; Information and Software Technology 45 (2003), Jun. 1, 2002; pp. 11-22.
Torsten Grabs et al.; XMLTM: Efficient Transaction Management for XML Documents; CIKM'02, Nov. 4-9, 2002; pp. 142-152.
Michael Floyd, "Debugging XML Applications", Aug. 2000, www.webtechniques.com, pp. 79-81.
James E. Powell, "Microsoft Office Beta 2 on the Horizon", WinMag.com, Nov. 3, 2000.

Milbery, J., "WorX Se", XML Journal, published Feb. 4, 2001, downloaded from http://xml.sys-con.com/read/40149.htm, downloaded pp. 1-5.
Patrick Marshall, "DocuShare 2.0 Makes Web Document Management Work", Sep. 27, 1999.
Dan Franks, "Crowd Control (Secrets)", Jun. 1, 2002, MacWorld, vol. 19, No. 6, p. 102.
John Lombardi, "Word Pro Excels at 'Team' Work", Info World, Jan. 8, 1996, p. 86.
Kathy Yakal, "Elegant Document Distribution", Computer Shopper, Nov. 1995, pp. 1-2.
Jon Udell, "Getting Traction", Jul. 12, 2002.
Sun Microsystems, "StarOffice XML File Format Working Draft", Jan. 2001, Draft 10, pp. 19, 89, 142, and 234, http://web.archive.org/web/20010603030227/xml.openoffice.org/xml_specification_draft.pdf.
Y. Ishitani, "Document Transformation System from Papers to XML Data Based on Pivot XML Document Method", IEEE Computer Society, Seventh International Conference on Document Analysis and Recognition, 6 pp., Aug. 3-6, 2003.
Altamura et al., "Transforming paper documents into XML format with Wisdom++", Nov. 7, 2000, IJDAR, pp. 6-12.
Klink et al., "Document Structure Analysis Based on Layout and Textual Features", Sep. 25, 2000, DFKI, pp. 1a, 3, 4, and 11.
"Creating DocBook Documents", Aug. 2, 2001, pp. 1 and 16, http://web.archive.org/web/20020615124747/www.docbook.org/tdg/en/html/ch02.html.
David Eisenberg, "Using XSL Formatting Objects", Jan. 17, 2001, pp. 1a and 1, http://www.xml.com/pub/a/2001/01/17/xsl-fo/index.html?page=2.
"Star Office XML File Format Working Draft", Sun Microsystems, Inc., pp. 57, 59.
W. Wadge, "Intensional Markup Language", Proceedings of the Third International Workshop, DCW 2000, Quebec City, Canada, Jun. 19-21, 2000, pp. 82-89.
Unicode Inc., "Unicode Technical Reports", Sep. 21, 2002, pp. 1, 2, 638, 642, and 644.
Star Office XML File Format Working Draft, Sun Microsystems, Inc., pp. 1, 19, and 196.
Rohr, Paul, "RE: Styles Again", downloaded from http://www.abisource.org/mailinglists/abiword-dev/01/May/0561.html, May 2001, pp. 1-2.
W3C, "XML Schema Requirements". W3C Note, Feb. 15, 1999, downloaded from www.w3.org/TR/NOTE-xml-schema-req, pp. 1-5.
Ray, Erik T., "Learning XML", O'Reilly & Associates, Inc., Jan. 2001, cover, copyright, and Chapter 5 downloaded pp. 1-25.
Glenn, Walter, "Word 2000 in a Nutshell", O'Reilly & Associates, Inc., Aug. 2000, cover, copyright, and sections 16.4 and 16.3, downloaded pp. 1-8.
Liberty, J. et al., "XML Web Documents from Scratch", Que Corporation, Mar. 10, 2000, cover, copyright, chapters 1 and 2, downloaded pp. 1-16.
Watchorn, H. et al., "Word and XML: Making the 'Twain Meet'", XML Europe 2001, papers, May 2001, downloaded pp. 1-11.
Novak, U. et al., "Experimental XSLT Processor for Objects", Proceedings of the JASTED Int'l Conf. On Applied Informatics, Feb. 2002, pp. 277-282.
XML Workshop Ltd., "Word to XML Converters", Mar. 7, 2003, downloaded pp. 1-2.
YAWC Pro, "Welcome to YAWC Pro", Dec. 11, 2001, 1 pg.
"YAWC Pro 1.0 Installation & User Guide", pp. 1-11.
"Case Study: Converting Word Into XML", YAWC Pro, 1 pg.
"Case Study: Maintaining Websites with Microsoft Word", YAWC Pro, 1 pg.
"Case Study: Publishing Content to the Web and Mobile Phones", YAWC Pro., 1 pg.
"Case Study: Typsetting XML with QuarkXPress", YAWC Pro, 1 pg.
Skylar, D., "The Annotated Rainbow DTD, Rainbow Version 2.5", Electronic Book Technologies, Inc., Feb. 8, 1995, pp. 1-12.
Tetrasix, "Welcome to Tetrasix Web Site", re: MajiX, Apr. 18, 2001, downloaded pp. 1-3.
Infinity-Loop, Web Site Home Page, re: infinity-loop, Apr. 20, 2001, 1 pg.
Sun Microsystems, "The OpenOffice.org Source Project", Sun Microsystems, Inc., 2000, downloaded pp. 1-34.
Harold, Rusty Elliotte, "XML Bible", IDG Books Worldwide, 1999, pp. 369-388.
W3C, "XML Schema Part 0: Primer", W3C Recommendation, May 2, 2001, downloaded pp. 1-67.
Case Western Reserve University (CRWU), "Introduction to HTML", Case Western Reserve University and Eric A. Meyer, Mar. 4, 2000, downloaded from web.archive.org/web/20000304042655/http://www.cwru.edu/help/introHTML/toc.html, downloaded pp. 1-157.
Lemay, Laura, "Teach Yourself Web Publishing with HTML 4 in 14 Days, Professional Reference Edition", Second Edition, Sams.net Publishing, 1997, pp. 778-789.
White, B. et al., "Standard Structural Elements" from "Web Content Accessibility Tips and Tricks", May 1, 2001, downloaded pp. 1-4.
Juran, J., "MML: The Modest Markup Language", October 22, 2000, downloaded pp. 1-15.
University of Georgia Center for Continuing Education, "Exploring the World-Wide Web, Hypertext Markup Language", February 24, 1999, downloaded pp. 1-7.
Cagle et al., "Professional XSL", Wrox Press Ltd., 2001, cover and copyright pp. 9-21.
Notice of Opposition filed by New Zealand Open Source Society Incorporated, dated Feb. 27, 2007, in NZ Patent Application No. 536149; 7 pgs.
AbiWord 2000 XSD—XML Schema file published via the Internet (awml_ref_5.xsd, dated Apr. 27, 2000); retrieved from the Internet: http://web.archive.org/web/20010608202916/http://www.abisource.com/awml.xsd; 3 pgs.
AbiWord Application available with Red Hat Linux 7.3; retrieved from the Internet: http://www.archive.orgiweb/20010306221828/dockbookorgArnl/4.1.1/doebookx.dtd; 3 pgs.
"Introduction to AbiWord," www.abisource.com, Jun. 8, 2001; retrieved from Internet: ULR:http://web.archive.org/web/20010608211934/www.abisource.com/help/en-US-index.html; 2 pgs.
"XML Schema for AbiWord Markup Language"; www.abisource.com, Apr. 27, 2000; retrieved from Internet: URL:http://www.abisource.com/awati.xsd; 3 pgs.
"AbiWord—Word Processing for Everyone", Kuro5hin, Apr. 23, 2002; retrieved from the Internet: URL:http:/www.kuro5hin.org/?op=displaystory;sid=2002/4/22/22406/9615>; 9 pgs.
Ayers, "AbiWord's Potential", Jul. 1999; retrieved from the Internet: http://linux.gazette.net/issue43/ayers.html; 4 pgs.
OpenOffice.org DTD—XML Schema file published via Internet (open_office_ref 8.dtd, dated Sep. 18, 2000); 1 pg.
Docbook DTD—XML Schema file available with Red Hat Linux 7.3 (docbook.dtd, dated Jun. 19, 2000); retrieved from the Internet: http://web.archive.org/web/20010608081323/docbook.org/xml/4.1.2/docbookx.dtd; 3 pgs.
Pradeep Jain; "Creating XML from Microsoft Word: The Challenges", Dec. 3-8, 2000, pp. 136-144.
Moseley, Lonnie et al., Mastering Microsoft Office 97 Professional Edition.
Liefke, Harmut et al., "Xmill. An Efficient Compressor for XML Data", SCM SIGMOD Record, vol. 29, Issue 2, May 2000, pp. 153-164; 6 pgs.
McGrath, Robert, "Representing "Binary" Data in XML", downloaded from http://ndf.ncsa.uiuc.edu/HDF5/XML/tools/binary.html, Mar. 2001, pp. 1-4.
Jeong, Euna et al., "Semistructured Data: Induction of Integrated View for XML Data With Heterogeneous DTDs", Proceedings of the Tenth International Conference on Information and Knowledge Management, Oct. 2001, pp. 151-158.
Jon Bosak, "XML: The Universal Publishing Format", May 1998, 3 pgs.
M. Fernandez et al., "Advanced Technology Seminar," p. 323 (Feb. 21, 2002).
Novak, U. et al., "Experimental Xslt Processor for Objects", Proceedings of the JASTED Int'l Conf. on Applied Informatics, Feb. 2002, pp. 277-282.

"XML Schema—Lecture 4 Notes", downloaded from http://www.cs.rpi.edu/~puninj/XMLJ/classes/class4/all.html, Nov. 21, 2001; 10 pgs.

"XML Schema Part 1: Structures", W3C Recommendation, 2 May 2001, downloaded from http://www.w3.org/TR2001/REC-xmlschema-1-20010502/, 94 pgs.

HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf; 29 pgs.

Microsoft Rich Text Form (RFT 1.7) specification, Aug. 2001, retrieved from the Internet: URL:http://www.microsoft.com/downloads/details.aspx?FamilyID=e5b8ebc2-6ad6-49f0-Sc90-e41763e3f045&DisplayLanz-en; 3 pgs.

Sun Microsystems, StarOffice 5.2, Jun. 6, 2002, retrieved from the Internet: URL:http://web.archive.org/vveb/20020210120419/www.sun.com/download; 2 pgs.

Statutory Declaration of Peter John Harrison dated Oct. 8, 2008, in support of Notice of Opposition in NZ Application No. 536149; 54 pgs.

Statutory Declaration of Matthew James-Cruickshank Holloway dated Dec. 22, 2008, in Support of Notice of Opposition in NZ Application No. 536149; 11 pgs.

Office Communication dated May 24, 2010 in NZ Application No. 536149; 1 pg.

Applicant Response and Amendments dated Jun. 22, 2010 in response to Opposition to NZ Application No. 536149; 6 pgs.

Castro, Elizabeth, "XML for the World Wide Web: Visual QuickStart Guide," Oct. 23, 2000, Peachpit Press, pp. 1-6.

Harold, Rusty Elliotte, "XML Bible", IDG Books Worldwide, 1999, title page, copyright page, and pp. 1-15, 95-132, 191-200, 333-336, 352-360, and 433-567.

O'Reilly, "HTML & XHTML the Definitive Guide," 4th Edition, Copyright 2000, pp. 1-6, http://oreilly.jungles.ru/webdesign/xhtml/ch16_03.htm.

Sun Microsystems, "StarOffice XML File Format Working Draft", Jan. 2001, Draft 10, pp. 19 and 234, http://web.archive.org/web/20010603030227/xml.openoffice.org/xml_specification_draft.pdf.

Sun Microsystems, "StarOffice XML File Format Working Draft", Jan. 2001, Draft 10, pp. 48, 49, 51, 54-58.

Statutory Declaration—Murray Mark Altheim, dated Oct. 7, 2009, filed in the Matter of an opposition to New Zealand Patent Application No. 536149, 81 pgs.

Statutory Declaration—Donald William Bain Christie, dated Sep. 30, 2009, filed in the Matter of an opposition to New Zealand Patent Application No. 536149, 76 pgs.

Statutory Declaration—Matthew James-Cruickshank Holloway, dated Aug. 12, 2008, filed in the Matter of an opposition to New Zealand Patent Application No. 536149, 11 pgs.

Statutory Declaration—Matthew James-Cruickshank Holloway, dated Oct. 2, 2009, filed in the Matter of an opposition to New Zealand Patent Application No. 536149, 9 pgs.

Statutory Declaration—Daniel R. Snyder, dated Sep. 16, 2010, filed in the Matter of an opposition to New Zealand Patent Application No. 536149, 27 pgs.

Examiner's Communication dated Jun. 25, 2010, accepting Amendments to New Zealand Application No. 536149, 1 pg.

Jones, B.; "*Open XML Formats—Intro to Word XML Part 1: Simple Word Document*"; Jul. 5, 2005; 6 pgs.

Jones, B.; "*Open XML Formats—History of office XML formats (1998-2006)*"; Jan. 25, 2007; 7 pgs.

Index of pub/sgml/ifi.uio.no.save/Rainbow; Feb. 10, 2005; 2 pgs.

Sun Microsystems, Inc., "*Sun Download Center*"; 2002.

Microsoft Download Center; "*Word 2002 Tool: Rich Text Format Specification*"; Aug. 31, 2001; 2 pgs.

Lenz, E., et al.; "*Office 2003 XML—Integrating Word with the Rest of the World*"; Chapter 2, pp. 16-101; O'Reilly.

"*Microsoft Word 5.0 (PC) Binary File Format*"; May 19, 1989; 25 pgs.

Red Hat, Inc.; "*Red Hat Linux 7.3 Release Notes*"; 2002; 6 pgs.

"*Microsoft Office '97 Manual*", Part II, Chapter 5; 385 pgs.

Sun Microsystems, Inc.; "*StarOffice™ 5.2—Setup Guide*"; 2002; 72 pgs.

Sun Microsystems, Inc.; "*StarOffice™ 6.0—Setup Guide*"; 2002; 71 pgs.

Sun Microsystems, Inc.; "*StarOffice™ 5.2—Setup Guide*"; 2002; 72 pgs.

Sun Microsystems; "*StarOffice—XML File Format Working Draft*"; Draft 9; Dec. 2000; pp. 1-393.

Search Report mailed Nov. 27, 2003, in SG Appl. No. 200302602-8.

Written Opinion mailed Oct. 22, 2004, in SG Appl. No. 200302602-8.

Written Opinion mailed Aug. 26, 2005, in SG Appl. No. 200302602-8.

Office Action mailed Jun. 6, 2007, in PH Appl. No. 1-2003-000315.

Office Action mailed Apr. 3, 2008, in PH Appl. No. 1-2003-000315.

Office Action mailed Aug. 22, 2008, in PL Appl. No. P360756, w/Translation.

Office Action mailed Oct. 22, 2008, in Au Appl. No. 2003204397.

Office Action mailed Dec. 2008 in CL Appl. No. 1295-2003, w/Translation.

Office Action mailed May 6, 2009, in PH Appl. No. 1-2003-000315.

Office Action mailed Aug. 31, 2009, in PL Appl. No. P360756, w/Translation.

Office Action mailed Dec. 4, 2009, in KR Appl. No. 10-2003-40987, w/Translation.

Office Action mailed Jun. 29, 2010, in KR Appl. No. 10-2003-40987, w/Translation.

Office Action mailed Dec. 21, 2010, in CA Appl. No. 2,427,122.

EchoEcho, "HTML Text: Basefont", publicly available since at least Jun. 11, 2002, EchoEcho.com, p. 1-3; http://web.archive.org/web/20020611063417/http://www.echoecho.com/htmltext01.htm.

Walther, P., "XML Dokumente in Microsoft Word mit neuem Produkt der struktur Ag kostenlos testen", http://www.contentmanager.de/magazine/news_h2695_xml_dokumente_in_microsoft_word_mit_neuem.html>, Jun. 5, 2002, 2 pgs.

Liefke, Harmut et al., "Xmill. An Efficient Compressor for XML Data", SCM SIGMOD Record, vol. 29, Issue 2, May 2000, pgs. 153-164; 6 pgs.

McGrath, Robert, "Representing "Binary" Data in XML", downloaded from http://ndf.ncsa.uiuc.edu/HDF5/XML/tools/binary.html, Mar. 2001, pp. 1-4.

Jeong, Euna et al., "Semistructured Data: Induction of Integrated View for XML Data With Heterogeneous DTDs", Proceedings of the Tenth International Conference on Information and Knowledge Management, Oct. 2001, pp. 151-158.

Jon Bosak, "XML: the Universal Publishing Format", May 1998, 3 pgs.

M. Fernandez et al., "Advanced Technology Seminar," p. 323 (Feb. 21, 2002).

Novak, U. et al., "Experimental XSLT Processor for Objects", Proceedings of the Jasted Int'l Conf. on Applied Informatics, Feb. 2002, pp. 277-282.

"XML Schema—Lecture 4 Notes", downloaded from http://www.cs.rpi.edu/~puninj/XMLJ/classes/class4/all.html, Nov. 21, 2001; 10 pgs.

"XML Schema Part 1: Structures", W3C Recommendation, May 2, 2001, downloaded from http://www.w3.org/TR2001/REC-xmlschema-1-20010501; 94 pgs.

HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf; 29 pgs.

Microsoft Rich Text Form (RFT 1.7) specification, Aug. 2001, retrieved from the Internet: URL:http•//www.microsoft com/downloads/details aspx?FamilyID=e5b8ebc2-6ad6-49f0-Sc90-e41763e3f045&DisplayLanz-en; 3 pgs.

Sun Microsystems, StarOffice 5.2, Jun. 6, 2002, retrieved from the Internet: URL:http://web.archive.org/web/20020210120419/www.sun.com/download; 2 pgs.

Statutory Declaration of Peter John Harrison dated Oct. 8, 2008, in support of Notice of Opposition in NZ Application No. 536149; 54 pgs.

Statutory Declaration of Matthew James-Cruickshank Holloway dated 22 Dec. 2008, in Support of Notice of Opposition in NZ Application No. 536149; 11 pgs.

Office Communication dated May 24, 2010 in NZ Application No. 536149; 1 pg.

Applicant Response and Amendments dated Jun. 22, 2010 in response to Opposition to NZ Application No. 536149; 6 pgs.

Office Action mailed Apr. 19, 2011, in U.S. Appl. No. 10/726,954.

* cited by examiner

- ❖ Document
  - ➢ Document Props
    - ▪ Information such as Compatibility and Root Element
  - ➢ Information Props
    - ▪ Author Name; Date Created; Modified, Custom Properties, etc.
  - ➢ Other Props
    - ▪ Properties for just about every element. Possible properties elements include: Document Props; Information Props; Character Props; Paragraph Props; Table Props; Section Props; and Object Props.
  - ➢ Styles
    - ▪ List Styles
      - • Information on a list. This includes the formatting at different list levels, the type of list, and any other information needed for a list.
    - ▪ Char Styles
      - • Information specific to text. For example, font information, shading, etc., that is related to the text.
    - ▪ Paragraph Styles
      - • Usually have Character Properties, as well as Paragraph Properties.
    - ▪ Table Styles
      - • Information specific to the design of the table, including information such as banding, etc.
  - ➢ Body of Word Processing Document
    - ▪ Section Props
      - • Information such as page layout, footer & header info, and other information specific to that section.
    - ▪ Section
      - • Paragraph (Style Name & List FO & List Level)
        - ♦ Properties
          - ➢ Paragraph Props
            - ▪ Indents, margins, shading, borders, and the like.
          - ➢ Character Props
            - ▪ Paragraph's font, color, etc.
        - ♦ Text Run (Character Style Name)
          - ➢ Properties
            - ▪ Character Props
          - ➢ Text
            - ▪ Text Content of Document
          - ➢ Images / Objects
        - ♦ Paragraph Mark
          - ➢ Represents the paragraph mark that can include character properties.
        - ♦ Bookmarks
          - ➢ Bookmark Begin (ID)
          - ➢ Bookmark End (ID)
      - • Table
        - ♦ Properties
          - ➢ Table Props
            - ▪ Information such as borders; width; and grid units
            - ▪ The Grid Units of the table may be referenced by the cells to get the cells width.
          - ➢ Table Row
            - ▪ Table Cell
              - • Paragraph

*Fig. 4*

WORD-PROCESSING DOCUMENT STORED IN A SINGLE XML FILE THAT MAY BE MANIPULATED BY APPLICATIONS THAT UNDERSTAND XML

RELATED APPLICATIONS

This application is a continuation of application Ser. No. 10/187,060, filed Jun. 28, 2002, now U.S. Pat. No. 7,523,394 which application is incorporated herein by reference.

COMPUTER PROGRAM LISTING APPENDIX

The attached compact disc submission includes two computer-readable format (CRF) compact discs, labeled "Computer Program Listing Appendix—application Ser. No. 11/005,192," created on May 14, 2010, size of 370 kb, each having identical ASCII text files, created on an IBM-compatible system, and are compatible for reading with MS-DOS and MS-WINDOWS operating systems. The computer program listing files submitted on the compact discs are incorporated herein by reference in their entirety as if set forth in full in this document for all purposes, and are further identified on the compact disc as follows:
   File Name: "Page11Line3 Page43Line24"; and
   File Name: "Page44Line5 Page109Line14"

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

Typically, word-processing documents are not understandable by external applications unless those applications are familiar with the specific structure of the document. This makes it very difficult for applications to manipulate the word-processing documents without extensive knowledge of the application. What is needed is a way to easily manipulate, create, and display documents associated with a word-processor.

SUMMARY OF THE INVENTION

The present invention is directed at providing a word-processing document in a native XML file format that may be understood by an application that understands XML, or to enable another application or service to create a rich document in XML so that the word-processing application can open it as if it was one of its own documents.

According to one aspect of the invention, a word-processor has a native XML file format. The well formed XML file fully represents the word-processor document, and fully supports the word-processor's rich formatting. Accordingly, one of the goals of such a native XML representation is have no feature losses when saving the word-processor documents in XML according to a defined XSD.

According to another aspect of the invention, there is a published XSD file that defines all the rules behind the word-processor's XML file format. The schema describes the word-processor's XML structure. The schema file mirrors the internal word-processor program while still allowing ease of use. Thus, the schema enables third party services and applications to create XML documents understandable by the word processing application.

According to yet another aspect of the invention, hints are provided within the XML associated files providing applications that understand XML a shortcut to understanding some of the features provided by the word-processor. By using the hints, the applications do not have to know all of the specific details of the internal processing of the word-processor in order to recreate a feature.

According to yet another aspect of the invention, the word-processing document is stored in a single XML file. An application will be able to fully recreate the document from this single XML file. This includes all the images and other binary data that may be present in the document. The invention provides for a way to represent all document data in a single XML file.

According to still yet another aspect of the invention, manipulation of word-processing documents may be done on computing devices that do not include the word-processor itself.

BRIEF DESCRIPTION OF THE DRAWINGS

FIG. 4 shows a tree view of an exemplary word-processor XML document;

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in an HTML document, the ML tends to specify the text's structural function (e.g., heading, paragraph, etc.)

The terms "word-processor markup language" or "WPML" refers to markup language elements that are associated with a word-processor application and a schema associated with the word-processor application. This type of ML or schema is also often called the word-processor's "native" schema or markup.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
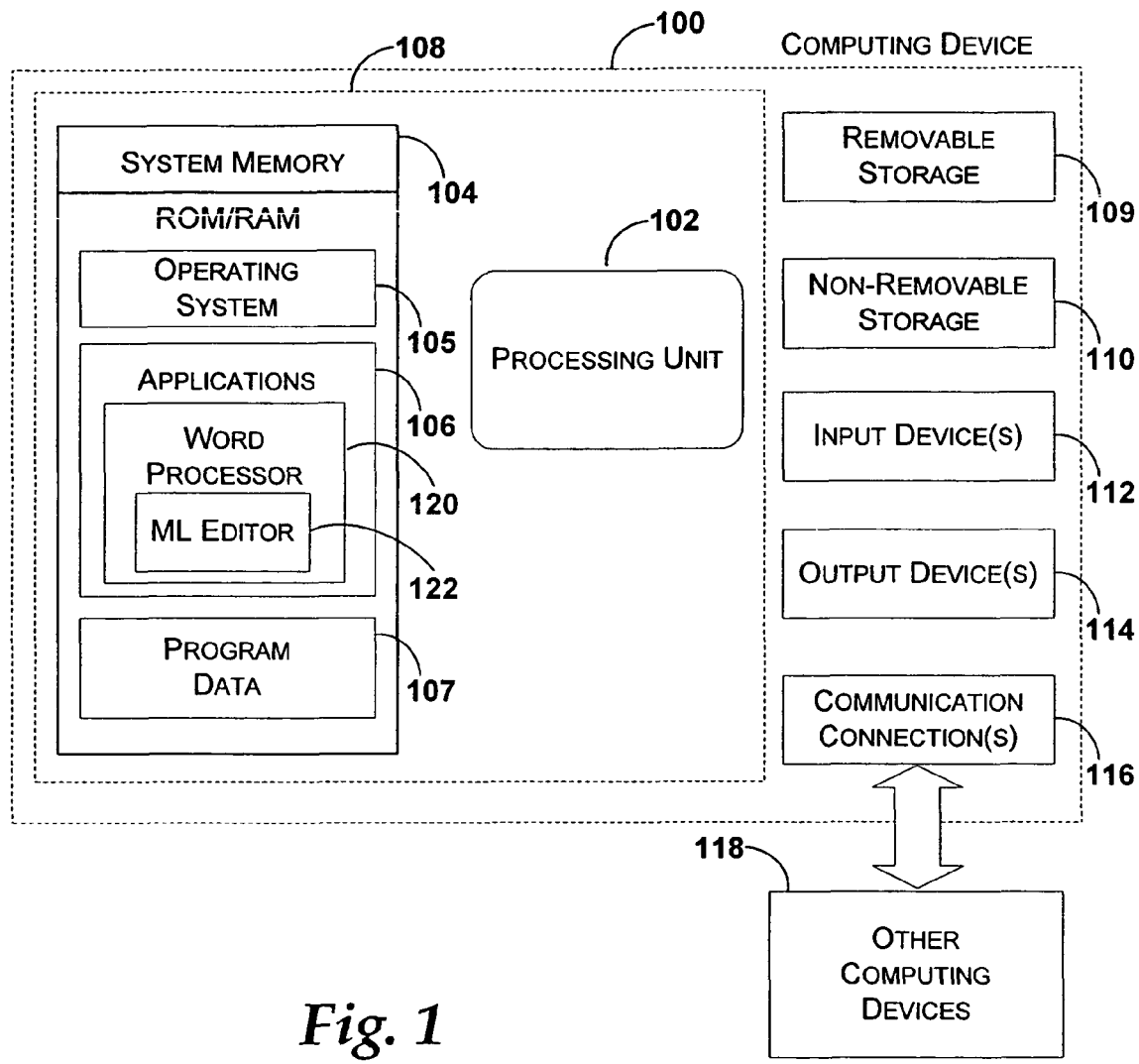
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes ML editor 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Word-Processor File Structure

Figure 2:
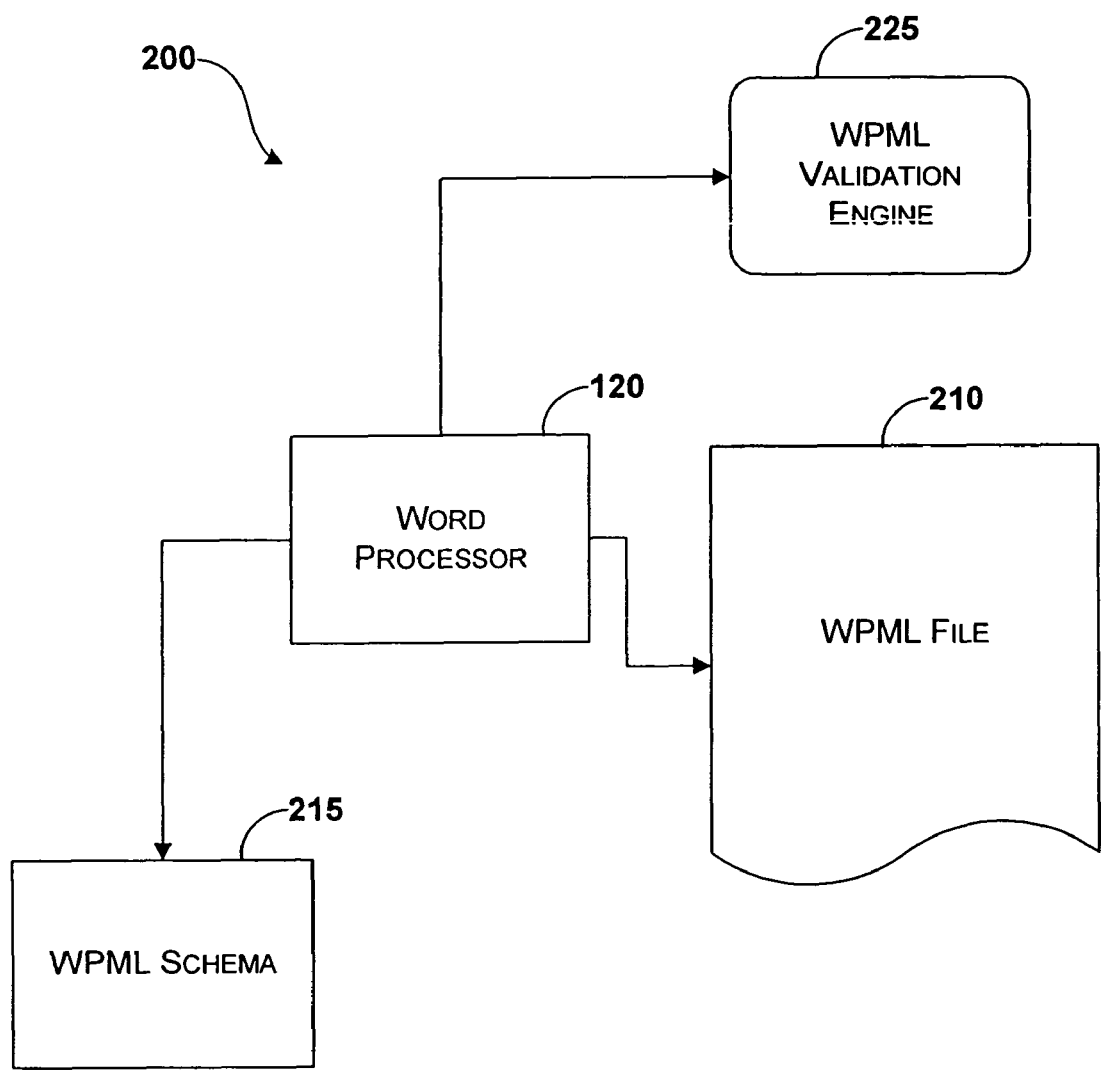
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, WPML file 210, WPML Schema 215, and WPML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native markup language, a Word-Processor Mark-up Language (WPML). The WPML is supported by word-processor 120 and may adhere to the rules of other markup languages, such as XML, while creating further rules of its own. A WPML provides a markup language that includes rich display information that a user can solicit without the need to spend time creating the schema corresponding to the display information.

Word-processor 120 internally validates WPML file 210. When validated, the WPML elements are examined as to whether they conform to the WPML schema 215. As previously described above, a schema states what tags and attributes are used to describe content in an ML document, where each tag is allowed, and which tags can appear within other tags, ensuring that the documentation is structured the same way. Accordingly, WPML 210 is valid when structured as set forth in arbitrary WPML schema 215.

WPML validation engine 225 operates similarly to other available validation engines for ML documents. WPML validation engine 225 evaluates WPML that is in the format of the WPML validation engine 225. For example, XML elements are forwarded to an XML validation engine. In one embodiment, a greater number of validation engines may be associated with word-processor 120 for validating a greater number of ML formats.

Figure 3:
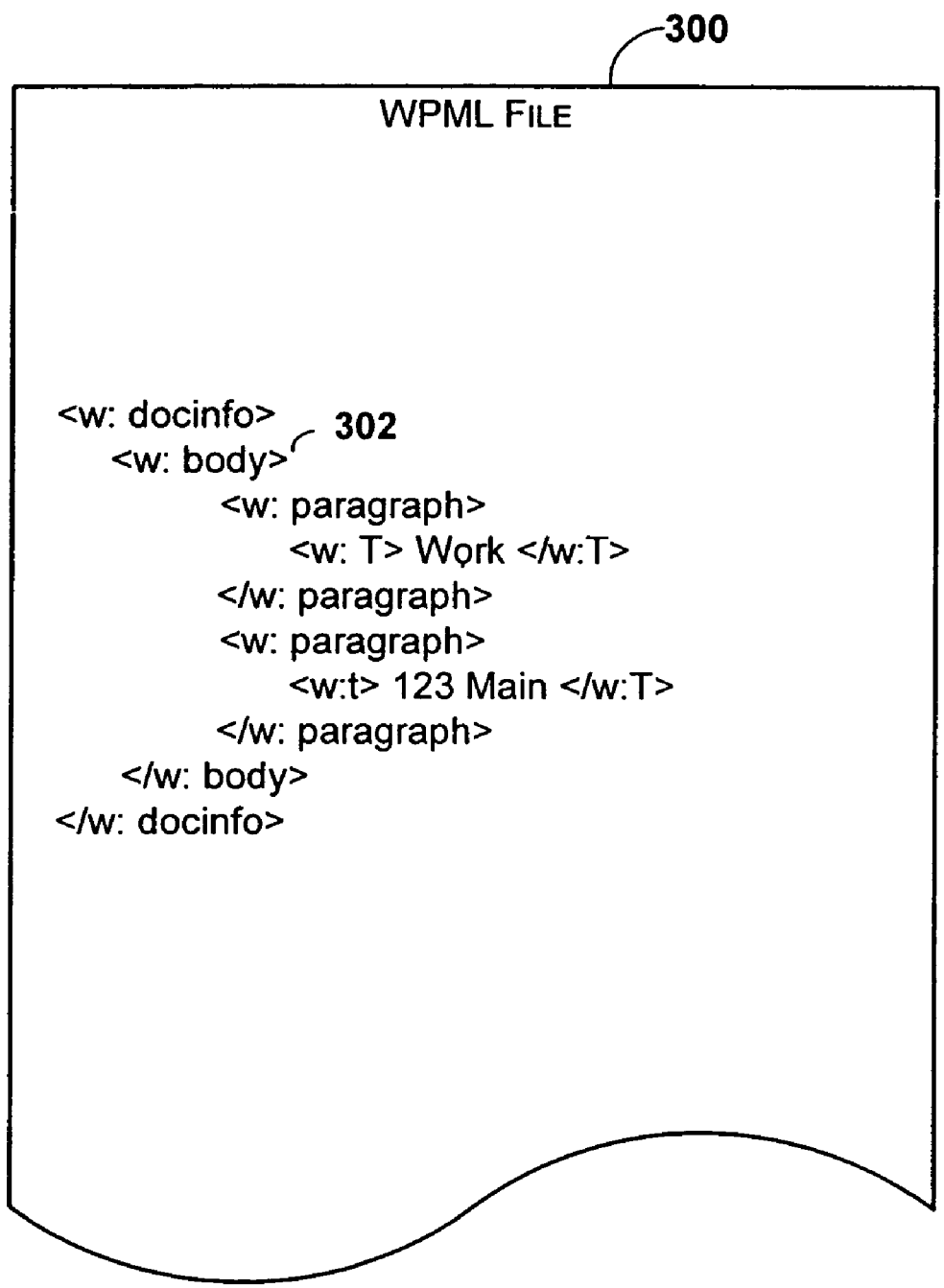
FIG. 3 shows an exemplary WPML file.

FIG. 3 illustrates an exemplary WPML file in accordance with the present invention. WPML file 300 includes WPML elements. An element in a markup language usually includes an opening tag (indicated by a "<" and ">"), some content, and a closing tag (indicated by a "</" and ">"). In this example, tags associated with WPML include a "w:" within the tag (e.g., 302). The "w:" prefix is used as shorthand notation for the namespace associated with the element.

There are enough WPML elements for an application that understands XML to fully recreate the document from this single XML file. Hint tags may also be included that provide information to an application to help understand the content of the file. For a more complete description of the WPML used according to one embodiment of the invention, please see the description below. An exemplary WPML file that is more detailed is also discussed below.

The text contained within the document follows the "T" tag, making it easy for an application to extract the text content from a word-processing document created in accordance with aspects of the invention. Given that the example shown is valid, WPML file 210 produces a document with a body and two paragraphs that include the text "Work" in the first paragraph and "123 Main" in the second paragraph.

FIG. 4 illustrates a tree view of a word-processor document, according to aspects of the invention. The first fields within the XML document relate to document information and properties.

For example, document statistics information may be stored. This information may include, but is not limited to, title, subject, author, manager, company, category, keywords. The information may also relate do document statistics such as creation date, modification date, last access date, last print date, number of pages, words, lines, characters, and the like. Custom properties may also be stored.

According to one embodiment of the invention, all of the fonts are defined up front. The font information includes the supporting font information.

Similarly, styles, tables, numbering, and the like are defined. The styles fields include formatting at different list levels, the type of list, and any other information needed for a list. Paragraphs contained within the XML document may point at list styles are they may default to a style.

The character style contains information that relates to the text within the word-processing document. For example the character style may include properties relating to the font style, size, color, underline style, text effects, scaling, spacing, kerning, and the like. Any character property defined by the word-processor may be included. The text of the word-processing document ("text runs") point to the styles to define how the text should be displayed. A hint may also be provided that helps an application display the text.

The paragraph style generally includes character properties as well as paragraph properties. Paragraph properties may include paragraph alignment, outline level, indentation, spacing before and after the paragraph, line spacing, pagination properties, and the like. The paragraph section may include information such as the style name of the paragraph, the list information, and the like.

Table styles will contain a lot of information specific to the design of the table. This will include information such as banding, etc. Table properties include information such borders; width; and grid units. The Grid Units of the table is referenced by the cells to get their width.

The text node contains the actual content of the document. All of the text for the word-processing document is stored within this node. This feature makes it very easy to be able to just access the content of the document. All of the other elements may be ignored if all that is desired is the text.

Section properties contain information such as page layout, footer and header information, and other information specific to a section of the word-processor document.

The text run references the character style name as well as allowing properties.

Images and objects are within a Paragraph. Even floating ones are contained in a paragraph. When floating, this is where an anchor would appear. According to one embodiment of the invention, images are stored as a binary encoding. For an exemplary image stored as a binary encoding, please refer to the exemplary word processor file below.

Template information relating to the word processor may also be stored within the word processor document. According to one embodiment of the invention, the template information is stored as a binary encoding within the word processor document.

A paragraph mark element represents the paragraph mark. Since the paragraph mark itself can have formatting applied to it, we need to output an element to represent the paragraph mark that we can give character properties.

As can be seen by the exemplary layout of the file, an application may use as much, or as little of the information as it desires. If the application desires to recreate or create the document exactly as the word-processor would then there is sufficient information within the document to do so. If the application desires to minimally format the content, on the other hand, then the application may do that as well.

Figure 5:
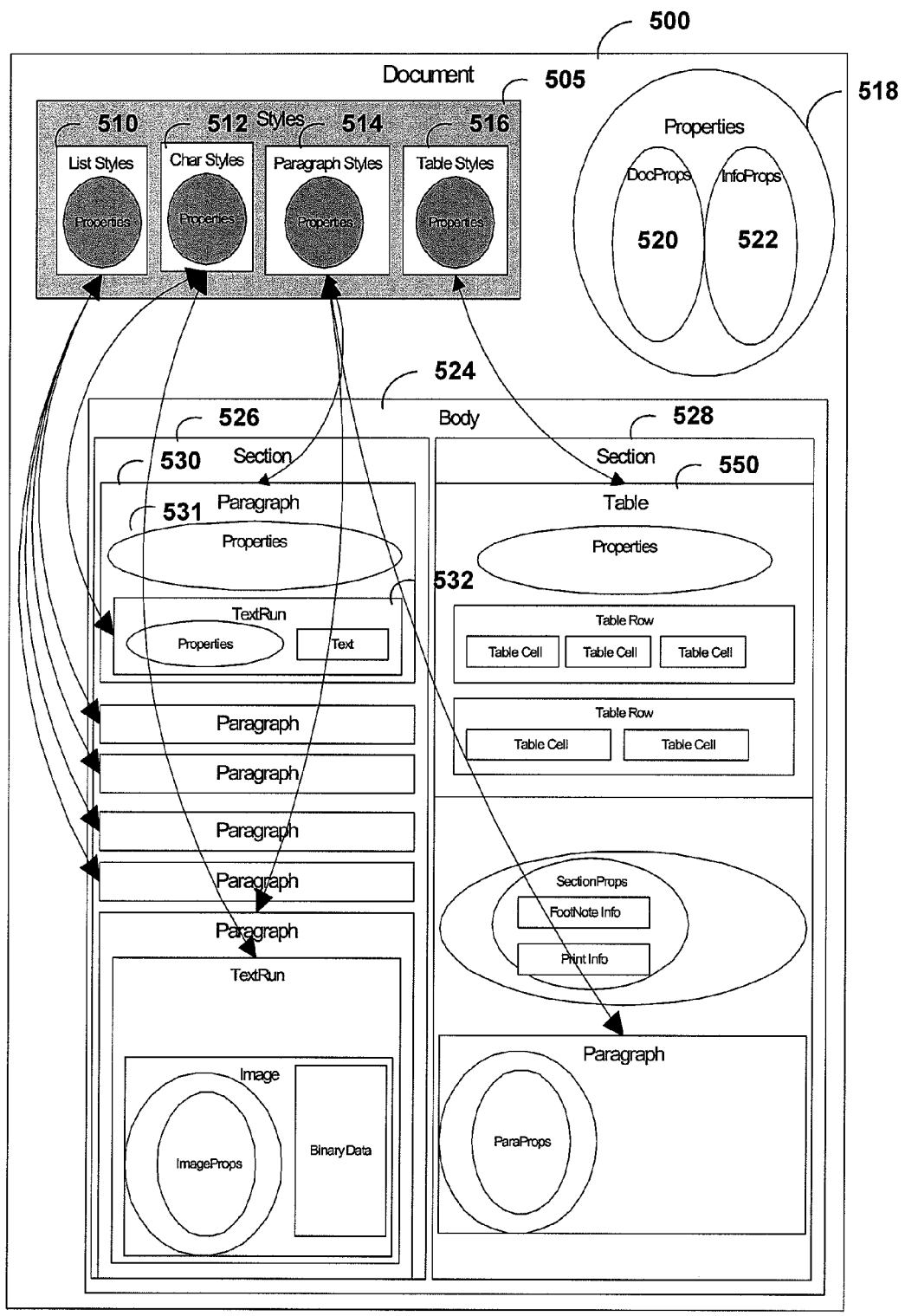
FIG. 5 illustrates a block diagram of an exemplary structure of a word-processor XML document.

FIG. 5 illustrates a block diagram (500) of a document, in accordance with aspects of the invention. Styles 505 include list styles 510, char styles 512, paragraph styles 514, and table styles 516. Properties 518 include document properties 520 and information properties 522. Body 524 includes exemplary section 526 and exemplary section 528. Section 526 includes paragraph 530 that includes specific property information 530 and text run 532. As can be seen, the text runs may include properties and the text or possibly an image or an object.

Exemplary section 528 includes table 550 that includes properties relating to the table and a definition of the table rows and the cells contained within the table. The sections may also include information relating to the footnotes, print information and the like.

Different parts of the document may refer to the styles (505) to define how the element will be displayed. For example, as illustrated within the figure, some paragraphs may refer to list styles 510 or paragraph styles 514. Text runs refer to char styles 512, and tables may refer to table styles 516.

The word-processor document includes all of the information within the document that allows it to be recreated an application.

Other information may also be included within the document that is not needed by the word-processing program. According to one embodiment of the invention a "hints" element is included that allows external programs to easily be able to recognize what a particular element is, or how to recreate the element. For example, a specific number format may be in a list and used by the external program to recreate the document without knowing the specifics of the style.

Figure 6:
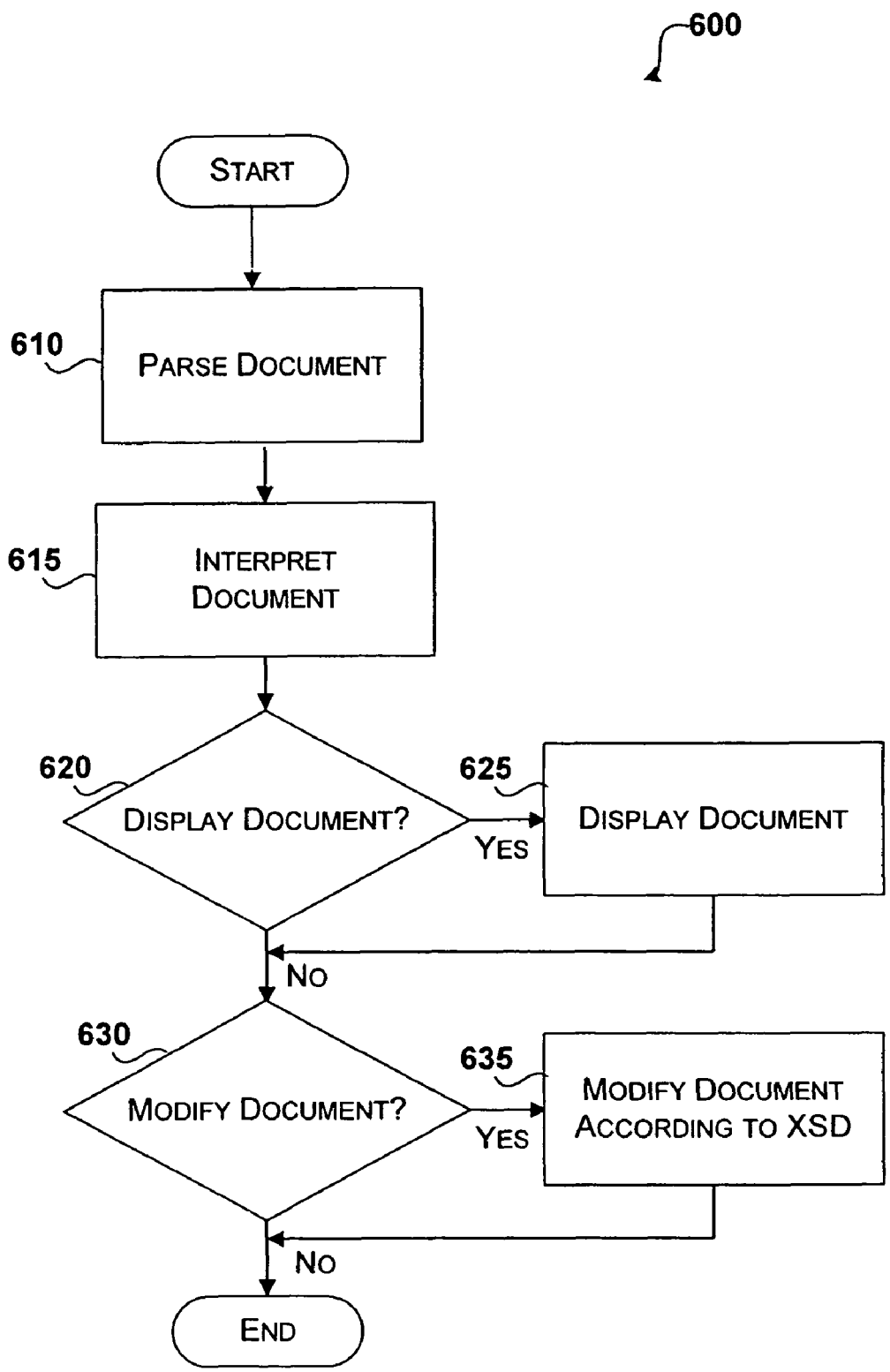
FIG. 6 illustrates a process flow for interpreting a word-processor document; in accordance with aspects of the present invention.

FIG. 6 illustrates a process 600 flow for intrepreting a word-processor document, in accordance with aspects of the invention. After a start block, the process moves to block 610, at which point the word-processor document is parsed. The parsing may include looking at the entire document, or only at specific portions of the document. For example, one application may parse the document for text only, another application may parse the document for text and images, whereas another document may desire the entire rich content within the document.

Flowing to block 615, the document is interpreted according to the published XSD. The XSD defines how to interpret the XML document created by the word-processor.

At decision block 620, a determination is made as to whether to display the document. When the document is to be displayed the process moves to block 625 where the document is displayed. The document may be displayed to a user for editing or some other purposes. When the document is not to be displayed, the process moves to decision block 630.

At decision block 630, a determination is made as to whether to modify the document. The document may be modified by a user or by the application itself with no user interaction. The document may be modified for many reasons. For example, additional text may be added or deleted, a portion of the document may be formatted differently, an image may be added, and the like. When the document is to be modified the process moves to block 635 where the document is modified. The document is modified in accordance with an XSD that defines all of the information needed to create a word-processor document. An exemplary XSD is described below.

As a further illustration of an exemplary word-processor document, the following is a word-processor document created in accordance with aspects of the present invention. According to one embodiment of the invention, the word-processor document is stored as a single XML document.

See ASCII text file entitled "Page11Line3 Page43Line24" on compact disc as referenced in the section above entitled "Computer Program Listing Appendix."

The word-processor document created in accordance with aspects of the invention is very rich. If desired, an application that understands XML may create and/or modify the word-processor document. The application may also ignore many of the elements within the document if so desired. For example, an application may desire to only know the text contained within the document. According to this particular example, the application would only have to extract the elements identified by the <w:T> tag.

In order for an application to understand the word-processor documents created by the word-processor, an XSD file is provided. Below is an exemplary XSD file that may be used for interpreting and/or creating the rich word-processing documents in XML.

See ASCII text file entitled "Page44Line5 Page109Line14" on compact disc as referenced in the section above entitled "Computer Program Listing Appendix."

As discussed above, hints may be provided within the XML associated files providing applications that understand XML a shortcut to understanding some of the features provided by the word-processor. By using the hints, the applications do not have to know all of the specific details of the internal processing of the word-processor in order to recreate a feature. Below is an exemplary hints schema, in accordance with aspects of the invention.

```xml
<?xml version="1.0" ?>
-<xsd:schema xmlns:xsd="http://www.w3.org/2001/XMLSchema"
targetNamespace="urn:schemas-microsoft-com:office:wordml-11.0:aux"
xmlns:wbld="urn-microsoft-com-word-build" xmlns="urn:schemas-microsoft-
com:office:wordml-11.0:aux" xmlns:W="urn:schemas-microsoft-com:office:wordml-
11.0" attributeFormDefault="qualified" elementFormDefault="qualified">
-<xsd:element name="sect" wbld:cname="sect">
-<xsd:complexType>
-<xsd:sequence>
    <xsd:element name="sub-section" minOccurs="0" maxOccurs="unbounded" />
  </xsd:sequence>
  </xsd:complexType>
  </xsd:element>
-<xsd:complexType name="FontElt">
    <xsd:attribute name="val" type="xsd:string" />
  </xsd:complexType>
    <xsd:element name="AllowEmptyCollapse" />
    <xsd:element name="Font" type="FontElt" />
-<!--
  BG COLOR PROPERTY
  -->
-<xsd:complexType name="bgcolorType">
-<xsd:attribute name="bgcolor">
-<xsd:simpleType>
-<xsd:union>
-<xsd:simpleType>
-<xsd:restriction base="xsd:hexBinary">
    <xsd:length value="6" fixed="true" />
  </xsd:restriction>
  </xsd:simpleType>
-<xsd:simpleType>
-<xsd:restriction base="xsd:string">
    <xsd:enumeration value="auto" />
  </xsd:restriction>
  </xsd:simpleType>
  </xsd:union>
  </xsd:simpleType>
  </xsd:attribute>
  </xsd:complexType>
-<xsd:complexType name="bdrwidthType">
    <xsd:attribute name="bdrwidth" type="xsd:integer" />
  </xsd:complexType>
-<!--
  ESTIMATE PROPERTY
  -->
-<xsd:attribute name="estimate">
-<xsd:simpleType>
-<xsd:restriction base="xsd:string">
    <xsd:enumeration value="true" />
    <xsd:enumeration value="false" />
  </xsd:restriction>
```

-continued

```
    </xsd:simpleType>
  </xsd:attribute>
  <xsd:complexType name="StringElt">
    <xsd:attribute name="val" type="xsd:string" />
  </xsd:complexType>
  <xsd:element name="t" type="xsd:string" />
  <xsd:element name="UIName" type="StringElt" />
  <xsd:element name="CnfStyle" type="StringElt" />
</xsd:schema>
```

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for interacting with a document on a computing device utilizing a processor, comprising:
parsing the document, wherein the document is contained within a single XML (extensible Markup Language) file and includes all instructions necessary to display the document according to how an application that created the document would display the document; wherein the document includes text that is stored within text runs; wherein each of the text runs is a text run element that includes a text element as a child that includes a start text tag and an end text tag; wherein all of the text of the document are stored between the start text tags and end text tags that are each nested below one of the text run elements; wherein there are no intervening elements that are contained between each of the start text tags and each of the corresponding end text tags; and wherein each of the start text tags does not include formatting information for the text that is stored between the start text tags and the end text tags; wherein formatting information for the text that is stored between the start text tags and the end text tags are stored in the text run element that is a parent of the text element; wherein the document further includes a first XML element and a second XML element that are related to each other through a common identifier that is specified as an attribute of the first XML element and the second XML element; wherein the first XML element is different from the second XML element and wherein the first XML element and the second XML element each include the common identifier that is specified as an attribute of the XML element that links the first related element to the second related element; wherein the first related XML element acts as a start tag for a feature and the second related XML element acts as an end tag for the feature even though the first related XML element and the second related XML element are different XML elements; and
interpreting the document according to a published XSD (XML Schema Definition).

2. The method of claim 1, further comprising displaying the document according to the instructions contained within the single XML file.

3. The method of claim 2, wherein the XSD includes definitions for all features incorporated within the application that created the document.

4. The method of claim 2, wherein displaying the document further comprises formatting text according to style and properties contained within the single XML file.

5. The method of claim 4, further comprising extracting text from the single XML file by searching for each start text tag indicating that the information following the tag is the text associated with the document.

6. A computer-readable storage medium having computer-executable instructions which when executed by a processor perform steps, comprising:
parsing the document, wherein the document is contained within a single XML (extensible Markup Language) file and includes all instructions necessary to display the document according to how an application that created the document would display the document; wherein the document includes text that is stored within text run XML elements; wherein each of the text run XML elements includes a text XML element as a child; wherein each text XML element is defined by a start text tag and an end text tag; wherein all of the text of the document are stored between the start text tags and end text tags that are each nested below one of the text run XML elements; wherein there are no intervening XML elements that are contained between each of the start text tags and each of the corresponding end text tags; and wherein each of the start text tags does not include formatting information for the text that is stored between the start text tags and the end text tags; wherein formatting information for the text that is stored between the start text tags and the end text tags are stored in the text run XML element that is a parent of the text element; wherein the document further includes a first XML element and a second XML element that are related to each other through a common identifier that is specified as an attribute of the first XML element and the second XML element; wherein the first XML element is different from the second XML element and wherein the first XML element and the second XML element each include the common identifier that is specified as an attribute of the XML element that links the first related element to the second related element; wherein the first related XML element acts as a start tag for a feature and the second related XML element acts as an end tag for the feature even though the first related XML element and the second related XML element are different XML elements; and
interpreting the document according to a published XSD (XML Schema Definition).

7. The computer-readable storage medium of claim 6, further comprising displaying the document according to the instructions contained within the single XML file.

8. The computer-readable storage medium of claim 7, wherein the XSD includes definitions for all features incorporated within the application that created the document.

9. The computer-readable storage medium of claim 7, wherein displaying the document further comprises formatting text according to style and properties contained within the single XML file.

10. The computer-readable storage medium of claim 9, further comprising extracting text from the single XML file by searching for each start text tag indicating that the information following the tag is the text associated with the document.

* * * * *